United States Patent [19]
Bender

[11] Patent Number: 5,376,719
[45] Date of Patent: *Dec. 27, 1994

[54] PHENOLIC-RESIN-MODIFIED CYCLOPENTADIENE RESINS, PROCESS FOR THE PREPARATION THEREOF AND USE THEREOF

[75] Inventor: Albert Bender, Mainz, Germany

[73] Assignee: Hoechst Aktiengesellschaft, Germany

[ * ] Notice: The portion of the term of this patent subsequent to Nov. 8, 2011 has been disclaimed.

[21] Appl. No.: 222,673

[22] Filed: Apr. 4, 1994

[30] Foreign Application Priority Data

Apr. 5, 1993 [DE] Germany ............................ 4311127

[51] Int. Cl.$^5$ ................ C08L 93/04; C08G 8/34; C08G 14/12; C09D 11/08
[52] U.S. Cl. .................... 525/54.4; 525/139; 528/158.5; 528/159; 106/30 R
[58] Field of Search ............... 525/54.4, 139; 528/158.5, 159; 106/30 R

[56] References Cited

U.S. PATENT DOCUMENTS 3,887,513  6/1975  Fritze et al. .
4,139,500  2/1979  Rudolphy .
4,552,923  11/1985  Tsuchiya et al. .
5,082,876  1/1992  Iyer et al. .

Primary Examiner—Vasu S. Jagannathan
Attorney, Agent, or Firm—Bierman and Muserlian

[57] ABSTRACT

Phenolic-resin-modified cyclopentadiene resins, process for the preparation thereof and use thereof Phenolic-resin-modified cyclopentadiene resins which can be used as binder in printing inks can be advantageously directly prepared from a) from 20 to 80% by weight of cyclopentadiene compounds,
  b) from 1 to 40% by weight of natural resin acids,
  c) from 1 to 60% by weight of phenols and
  d) from 1 to 20% by weight of aldehydes in the presence of
  e) from 0.01 to 1% by weight of basic alkali metal compounds.

The catalysis by basic alkali metal compounds makes possible the quantitative reaction of c) and d) in the reaction mixture of a) and b).

2 Claims, No Drawings

PHENOLIC-RESIN-MODIFIED CYCLOPENTADIENE RESINS, PROCESS FOR THE PREPARATION THEREOF AND USE THEREOF

The invention relates to phenolic-resin-modified cyclopentadiene resins, an improved process for the preparation thereof from natural resin acids, cyclopentadiene compounds, phenols and aldehydes in the presence of catalysts and also use thereof.

DE-C 24 06 555 discloses oil-soluble resins which are advantageously used as binder resins in inks for offset printing and have good compatibility with mineral oil. They are obtained by modification of natural resin acids with hydrocarbon resins and phenolic resins.

In the modification step with phenolic resin, there are two possible ways of proceeding. Either the phenolic resin is added to the hydrocarbon resin in the form of a resol prepared in a separate stage prior to the actual reaction. Or alternatively, the resol is prepared in situ in the hydrocarbon resin melt from the individual components, namely the corresponding phenol and the aldehydes, usually formaldehyde, under the action of a catalyst.

Catalysts used for the reaction of phenol with aldehyde in the hydrocarbon resin melt are basic compounds of magnesium, calcium or zinc. However these catalysts have the serious disadvantage that they can only incompletely catalyze the reaction of formaldehyde with phenols in the melt of the product of the reaction between natural resin acids and the cyclopentadiene resins. As a result, in the actual polycondensation of the preliminary stage comprising hydrocarbon resin modified by natural resin acid with the phenol/aldehyde condensation product formed in the melt of the latter, which polycondensation is carried out at elevated temperature, up to 30% by weight of the added but unreacted aldehyde can then distill out of the reaction mixture together with other volatile substances. This aldehyde then has to be either recovered by fractional distillation or disposed of as distillate by incineration. In either case, this procedure is uneconomical. Even at superatmospheric pressure, for example in the range from 3 to 5 bar, the reaction does not go to completion. In addition, there is formation of insoluble fractions which negatively affect the resin properties.

The phenolic-resin modification customarily strives for a molecular weight increase which causes high solution viscosities which are advantageous for a good result in printing. However, if too much aldehyde is lost, then the products show an insufficient molecular weight increase which manifests itself in disadvantageous, low solution viscosities and reduced printing performance, for example in poor absorption characteristics and unsatisfactory drying.

For industrial implementation, it is in addition advantageous to directly use low-molecular-weight cyclopentadiene compounds in place of the polymeric hydrocarbon resins. It has therefore already been proposed that resins be prepared from reaction products of natural resin acids with cyclopentadiene compounds and modification with precondensed phenolic resins (German Patent Application P 42 11 721). However, this process has the disadvantage that in this variant the phenolic resins have to be prepared in a separate process step.

It is therefore an object of the present invention to provide phenolic-resin-modified cyclopentadiene resins directly by reaction of natural resin acids with cyclopentadiene compounds and further reaction with aldehydes and phenols with these reacting quantitatively.

This object is achieved according to the invention by using basic alkali metal compounds, preferably of lithium, sodium or potassium, particularly of lithium, as catalysts for the resol formation.

The invention accordingly provides phenolic-resin-modified cyclopentadiene resins which can be prepared from a) from 20 to 80% by weight of cyclopentadiene compounds,
b) from 1 to 40% by weight of natural resin acids,
c) from 1 to 60% by weight of phenols and
d) from 1 to 20% by weight of aldehydes in the presence of
e) from 0.01 to 1% by weight of basic alkali metal compounds.

The phenolic-resin-modified cyclopentadiene resins according to the invention can be preferably prepared by reaction of from 25 to 60, in particular from 30 to 50, % by weight of cyclopentadiene compounds, from 5 to 30, in particular from 10 to 25, % by weight of natural resin acids, from 20 to 50, in particular from 25 to 35, % by weight of phenols, from 3 to 15, in particular from 5 to 10, % by weight of aldehydes in the presence of from 0.05 to 0.8, in particular from 0.1 to 0.2, % by weight of basic alkali metal compounds.

The invention also provides a process for preparing the phenolic-resin-modified cyclopentadiene resins. This can be carried out in a single-vessel process by simultaneously reacting the components a), b), c), d) and e) with one another. However, it is proposed that the components a) and b) are first reacted with one another and this reaction product is then allowed to react with the components c), d) and e).

Suitable cyclopentadiene compounds a) are those comprising a predominant proportion of cyclopentadiene units, such as cyclopentadiene, methylcyclopentadiene, dicyclopentadiene and polymeric cyclopentadiene resins. The resins are generally made up of hydrocarbon fractions having a boiling range from 20° to 180° C., preferably from 30° to 165° C. For the purposes of the present invention, a) are preferably liquid cyclopentadiene compounds such as oligomers of cyclopentadiene, for example di-, tri- and tetramers obtainable by Diels-Alder addition and also the alkyl derivatives or cooligomers of these compounds with, for example, methylcyclopentadiene, isoprene or piperylene. The starting materials in question do not need to have a high degree of purity. For example, use may be made of fractions, in particular concentrated fractions, which are formed by thermal dimerization of a C5 fraction, this C5 fraction being obtained as byproduct in the thermal decomposition of naphtha and corresponding petroleum fractions. In such a dimerization, the cyclopentadiene or methylcyclopentadiene contained in such a fraction is converted into dicyclopentadiene, dimethyldicyclopentadiene, a dimer of cyclopentadiene and methylcyclopentadiene, a dimer of cyclopentadiene and isoprene, a dimer of cyclopentadiene/piperylene and other corresponding dimeric substances. These fractions can contain further unsaturated monomers, such as propylene, butene, butadiene, pentene, cyclopentene or cyclohexene. So-called C9 fractions formed as byproduct in the cracking of naphtha can also be present. These then comprise, for example, styrene, alpha-methylstyrene, vinyltoluene, indene, methylindene or mixtures thereof.

Suitable natural resin acids b) are, for example, rosin, tall resin acid, wood resin, dimerized hydrogenated or polymerized rosin of any origin.

The reaction of a) with b), which is preferably carried out thermally, can be carried out in bulk but also in the presence of inert solvents. Suitable solvents for this purpose are, for example, aromatic hydrocarbons such as benzene, toluene, xylenes and tetrahydronaphthalene, aliphatic hydrocarbons such as isooctane, white spirit and also mixtures of alkylated benzenes having a boiling range from 100° to 200° C. If volatile cyclopentadiene compounds are used, the process is preferably carried out at superatmospheric pressure because of the high reaction temperature. This is preferably up to 10 bar. Owing to the oxidation sensitivity of the reaction products, it is additionally advantageous to carry out the reaction in an atmosphere of a gas which is inert under the reaction conditions, such as nitrogen or carbon dioxide. The reaction temperature for the reaction of components a) and b) is from 50° to 300° C., preferably from 100° to 280° C. After the reaction is complete, the reaction products obtained can be isolated as solids by, if desired, distilling off solvent and unreacted monomers. Their softening point generally lies between 40° and 200° C., preferably between 120° and 170° C. However, it is simpler to react the products obtained by reaction of a) with b) without prior isolation with the compounds c), d) and e). This embodiment is therefore preferred.

Suitable phenols c) are phenol, substituted phenols such as alkylphenols, preferably those having from 1 to 12 carbon atoms in the alkyl radical, aryl- or aralkylphenols, for example cresols such as m-cresol, 1,3,5-xylenols, isopropyl-, p-tert-butyl-, amyl-, octyl- or nonylphenol, phenylphenol, cumylphenol, also diphenylolpropane. Suitable aryl- or aralkylphenols or phenols which are substituted by other carbocyclic groups are those which are obtained by addition reaction of unsaturated monomers such as styrene, α-methylstyrene, α-chlorostyrene, vinyltoluene, cyclopentadiene with phenols in a known manner using acid catalysts. The predominant proportion of alkyl- or aralkylphenols allows desired compatibilities of the reaction mixtures with aliphatic hydrocarbons to be achieved. Preference is given to bifunctional phenols, i.e. those phenols in which two positions ortho and/or para to at least one phenolic OH group are free and reactive. Trifunctional phenols and those of higher functionality are generally only used together with bifunctional phenolic components, for example the specified alkylphenols and/or addition products of the phenols with unsaturated monomers. Here the at least trifunctional phenols, for example phenol or diphenylolpropane, can also be used in a proportion of preferably up to 10, in particular up to 5, % by weight, based on the total amount of phenols. The proportion of trifunctional phenols added allows the solubility of the end products, in particular in aliphatic hydrocarbons, to be controlled. On the other hand, a higher content of trifunctional phenols can be used to increase the solubility of the products in aromatic hydrocarbons.

Aldehyde components d) which may be mentioned are, for example, aldehydes having from 1 to 7 carbon atoms, in particular formaldehyde in monomeric form or various polymeric forms such as trioxane and paraformaldehyde, but also other aldehydes such as acetaldehyde, butyraldehyde, isobutyraldehyde, benzaldehyde or furrural. The molar ratio of phenol to aldehyde can vary within wide limits and is, for example, at least 1:0.9 and at most 1:4, preferably from 1:1 to 1:3, in particular up to 1:2.5. The nature and amount of the phenol/aldehyde components in the starting mixture allow the viscosity of the end products to be conveniently controlled. Various phenols in the form of a mixture can also be used. On the other hand, they can also be reacted, if desired, in the form of adducts obtained by addition of unsaturated monomers, for example the abovementioned, to the phenols.

The reaction of c) with d) is carried out according to the invention by reacting these compounds in a temperature range preferably from 50° to 150° C., in particular from 100° to 140° C., in the presence of a catalyst e) in the melt of the reaction product of a) and b) or else a solution thereof. This reaction is advantageously carried out under pressure, preferably between 1 and 10 bar, in particular 1.5 and 4 bar.

It is here absolutely necessary to use a catalyst e). Catalysts e) used are preferably basic compounds of lithium, sodium and potassium, such as, for example, the hydroxides, oxides, carbonates, hydrogencarbonates, formates, acetates and oxalates.

Sodium and potassium compounds react c) with d) completely, but here there can be a formation of insoluble fractions which can have a negative effect on the resin properties. Use of lithium compounds as catalysts achieves complete reaction of c) with d) without insoluble fractions occurring in the resin. The use of basic lithium compounds, in particular lithium hydroxide, is therefore particularly preferred.

After resol formation is complete, further reaction is advantageously carried out without pressure. The reaction of the resol formed with the hydrocarbon resin is brought about by heating to high temperatures so that the water of reaction distills off. The reaction temperature is here generally from 200° to 300° C., preferably from 240° to 270° C.

The progress of the reaction to the cyclopentadiene resins modified according to the invention is monitored by the determination of characteristic parameters, such as acid number or viscosity, in a suitable solvent. As soon as the desired values are reached, the reaction is stopped by cooling to room temperature. If there are solvents in the reaction mixture, these are advantageously removed beforehand by volatilization, for example by distillation. However, in some cases it may be desired to at least partially leave the solvents, in particular aliphatic-rich mineral oils preferably having a boiling range from 240° to 320° C., in the products to vary the melting point and viscosity of the resin as wished. Anything from solid through a liquid resin/mineral oil varnish to solution is possible here.

The process of the invention makes possible the advantageous preparation of phenolic-resin-modified cyclopentadiene resins which dissolve to give clear solutions, by reaction of natural resin acids with low-molecular-weight cyclopentadiene compounds, phenols and aldehydes.

The products prepared according to the invention are high-melting resins. Such products have a melting range from 120° to 225° C., preferably from 135° to 200° C. They are compatible with mineral oil having a boiling range from 240° to 270° C. and an aniline point of 72° C., preferably in a weight ratio of resin to oil from at least 1:3 to 1:10. It is therefore possible to dilute particularly high-melting products of the invention which are obtained according to the invention, after the reaction with, for example, aliphatic-rich mineral oils and thereby to obtain a lowering of melting point and viscosity.

The invention further provides for the use of the phenolic-resin-modified cyclopentadiene resins of the invention as binders.

Solutions of the products in aliphatic mineral oils can also be used as varnishes for coatings, in particular paints and printing inks. For this purpose, they can be readily processed with alkyd resins, driers such as naphthenates or octoates of cobalt, zinc, manganese, lead or the like, and pigments, also with generally up to 1% by weight of chelate-forming metal compounds such as titanates or aluminum alkoxides to give printing-ink binders for sheet offset printing and rotary offset printing. The chelate-formers can aid a certain amount of gel formation to the desired degree and thus also contribute to more rapid drying and a better lay on the paper.

The following examples serve to illustrate the invention without limiting it.

COMPARATIVE EXAMPLE 1

Preparation of a resin according to the directions of Patent Application P 42 11 721 (Example 2) in the presence of magnesium oxide 300 g of rosin are heated to 260° C. in a 3 l pressure apparatus. 700 g of dicyclopentadiene containing 75% of cyclopentadiene units are metered into this in the course of 2 h and the mixture is maintained for a further 5 hours while stirring at this temperature, the pressure which had initially risen to 9 bar dropping back to 5 bar. The melt is then allowed to cool to 110° C. 627 g of nonylphenol, 172 g of paraformaldehyde and 2 g of magnesium oxide are then added to this cooled melt. The apparatus is then closed and made pressure-tight and is heated to 150° C. for 4 hours, a pressure of up to 4 bar being established. The vessel is then depressurized to atmospheric pressure and flushed with nitrogen and is heated to 260° C. After 25 hours at 260° C., the reaction is stopped. 1422 g of a brittle solid resin (79% of theoretical) having a melting point from 155° C. are obtained. A 40% strength by weight solution in a low-aromatic mineral oil of boiling range from 240° to 270° C. and aniline point of 72° C. has a viscosity of 5 dPa.s. The solution is turbid, thus contains undissolved material.

EXAMPLE 1

Preparation of a resin similarly to Comparative Example 1 in the presence of the equivalent amount of lithium hydroxide The procedure is as given in Comparative Example 1, magnesium oxide being replaced by 1.2 g of lithium hydroxide. After 16 hours reaction time at 260° C. 1550 g (86% of theoretical) of a brittle solid resin having a melting point from 165° C. are obtained. A 40% strength by weight solution in a low-aromatic mineral oil of boiling range from 240° to 270° C. and aniline point of 72° C. has a viscosity of 80 dPa.s. The solution is clear and shows no undissolved material. The compatibility of the resin with the mineral oil is better than 1:10.

COMPARATIVE EXAMPLE 2

Preparation of a resin similarly to Comparative Example 1 in the presence of the equivalent amount of calcium oxide The reaction of Comparative Example 1 is carried out with 2.8 g of calcium oxide as catalyst. 1410 g (78% of theoretical) of a brittle solid resin having a melting point from 155° C. are obtained. A 40% strength by weight solution in a low-aromatic mineral oil of boiling range from 240° to 270° C. and aniline point of 72° C. has a viscosity of 5 dPa.s. The solution is turbid, thus contains undissolved material.

COMPARATIVE EXAMPLE 3

Preparation of a resin similarly to Comparative Example 1 in the presence of the equivalent amount of zinc oxide The reaction of Comparative Example 1 is carried out with 4 g of zinc oxide. 1410 g (78% of theoretical) of a brittle solid resin having a melting point from 155° C. are obtained. A 40% strength by weight solution in a low-aromatic mineral oil of boiling range from 240° to 270° C. and aniline point of 72° C. has a viscosity of 5 dPa.s. The solution is cloudy, thus contains undissolved material.

COMPARATIVE EXAMPLE 4

Preparation of a resin according to the directions of DE-C 24 06 555 (Example 3b) in the presence of magnesium oxide 600 g of Portuguese rosin and 1200 g of a cyclopentadiene resin (iodine number 197, melting point 75° C.) are melted, 600 g of p-t-butylphenol and 100 g of xylene, 2 g of magnesium oxide and 260 g of paraformaldehyde are added and the mixture is condensed under reflux for 4 hours. The mixture is then heated with a water separator to 200° C. in one hour and maintained at 250° C. for 4 hours. The vessel is then evacuated down to 50 mbar to remove undesirable volatiles, the pressure set to atmospheric using nitrogen and the reaction is ended by cooling. The yield is 2370 g (89% of theoretical), the melting point is 185° C., the viscosity of a 40% strength by weight solution in mineral oil of boiling range from 240° to 270° C. and aniline point of 72° C. is 40 dPa.s. The solution is cloudy, thus contains undissolved material.

EXAMPLE 2

Preparation of a resin similarly to Comparative Example 4 in the presence of the equivalent amount of lithium hydroxide The procedure is as given in Comparative Example 4, magnesium oxide being replaced by 1.2 g of lithium hydroxide. After 10 hours reaction time there are obtained 2410 g (91% of theoretical) of solid resin which begins to melt from 190° C. The viscosity of a 40% strength by weight solution in mineral oil of boiling range from 240° to 270° C. and aniline point of 72° C. is 275 dPa.s. The solution is clear and shows no insoluble material. The compatibility of the resin with mineral oil is better than 1:10.

COMPARATIVE EXAMPLE 5

Preparation of a resin using nonylphenol in the presence of magnesium oxide 440 g of Portuguese rosin and 1060 g of a cyclopentadiene resin (iodine number 197, melting point 75° C.) are melted, 650 g of nonylphenol, 4 g of magnesium oxide and 440 g of paraformaldehyde are added and the mixture is condensed for 4 hours at a temperature of 130° C. and a pressure of 1.5 bar. The pressure is then set to atmospheric and the mixture is heated to 260° C. while distilling off volatile components. After 16 hours, the reaction is ended by cooling the mixture. The yield is 1632 g (63% of theoretical), the melting point is 125° C., the viscosity of a 40% strength by weight solution in mineral oil of boiling range from 240° to 270° C. and aniline point of 72° C. is 2.5 dPa.s. This resin solution is slightly turbid, thus contains undissolved material. To determine the formaldehyde content, the distillate is admixed with aqueous hydroxylamine hydrochloride solution, the liberated hydrochloric acid is back-titrated with potassium hydroxide solution and from the amount used the formaldehyde content is determined. About 110 g of formaldehyde are found in the distillate. Thus, 25% by weight of the amount of formaldehyde used have escaped from the reaction mixture.

EXAMPLE 3

Preparation of a resin similarly to Comparative Example 5 using the equivalent amount of lithium hydroxide 440 g of Portuguese rosin and 1060 g of a cyclopentadiene resin (iodine number 197, melting point 75° C.) are melted, 650 g of nonylphenol, 2.8 g of lithium hydroxide and 440 g of paraformaldehyde are added and the mixture is condensed for 4 hours at a temperature of 130° C. and a pressure of 1.5 bar. The pressure is then set to atmospheric and the mixture is heated to 260° C. while distilling off volatile components. After 16 hours, the reaction is ended by cooling the mixture. The yield is 2305 g (89% of theoretical), the melting point is 155° C., the viscosity of a 40% strength by weight solution in mineral oil of boiling range from 240° to 270° C. and aniline point of 72° C. is 85 dPa.s. The resin solution is completely clear and shows no insoluble material. The compatibility of the resin with mineral oil is better than 1:10. To determine the formaldehyde content, the distillate is admixed with aqueous hydroxylamine hydrochloride solution, the liberated hydrochloric acid is back-titrated with potassium hydroxide solution and the formaldehyde content is thereby determined. The formaldehyde content is below 0.1%.

EXAMPLE 4

Preparation of a resin similarly to Comparative Example 5 using the equivalent amount of sodium hydroxide 440 g of Portuguese rosin and 1060 g of a cyclopentadiene resin (iodine number 197 g of iodine/100 g of resin, melting point 75° C.) are melted, 650 g of nonylphenol, 4 g of sodium hydroxide and 440 g of paraformaldehyde are added and the mixture is condensed for 4 hours at a temperature of 130° C. and a pressure of 1.5 bar. The pressure is then set to atmospheric and the mixture is heated to 260° C. while distilling off volatile components. After 16 hours, the reaction is ended by cooling the mixture. The yield is 2310 g (90% of theoretical), the melting point is 155° C., the viscosity of a 40% strength by weight solution in mineral oil of boiling range from 240° to 270° C. and aniline point of 72° C. is 85 dPa.s. The resin solution is only slightly turbid, thus contains hardly any undissolved material. To determine the formaldehyde content, the distillate is admixed with aqueous hydroxylamine hydrochloride solution, the liberated hydrochloric acid is back-titrated with potassium hydroxide solution and the formaldehyde content is thereby determined. The formaldehyde content is below 0.1%.

EXAMPLE 5

Preparation of a resin with condensation of aldehyde and phenol in solution in the presence of lithium hydroxide 300 g of rosin and 300 g of xylene are heated to 260° C. in a 3 l pressure apparatus. 700 g of dicyclopentadiene containing 75% of cyclopentadiene units are metered into this in the course of 2 h and the mixture is maintained for a further 5 hours while stirring at this temperature, the pressure which had initially risen to 9 bar dropping back to 5 bar. The resin solution is then allowed to cool to 110° C. 627 g of nonylphenol, 172 g of paraformaldehyde and 1.2 g of lithium hydroxide are then added to this cooled solution. The apparatus is then closed and made pressure-tight and is heated to 150° C. for 4 hours, a pressure of up to 4 bar being established. The vessel is then depressurized to atmospheric pressure by flushing with nitrogen and is heated to 260° C. with xylene, water and other volatile components distilling off. After 16 hours reaction time at 260° C., 1550 g (86% of theoretical) of a brittle solid resin having a melting point from 165° C. are obtained. A 40% strength by weight solution in a low-aromatic mineral oil of boiling range from 240° to 270° C. and aniline point of 72° C. has a viscosity of 80 dPa.s. The solution is clear and shows no insoluble material. The compatibility of the resin with mineral oil is better than 1:10.

EXAMPLE 6

Use example

From the product of Example 1 an ink A was prepared and from the product of Comparative Example 1 an ink B was prepared, and the two were compared by testing in use. The following recipe was employed:

A base varnish containing 35% by weight of the printing ink resin, 13% by weight of a commercial alkyd resin (viscosity 200 dPa.s, oil length 76%), 19% by weight of linseed oil and 33% by weight of high-boiling mineral oil of boiling range from 280° to 310° C. is prepared in each case. A printing ink paste containing 32% by weight of pigment and 68% by weight of varnish is prepared therefrom using Litholrubin L6B and dispersion in a triple-roll mill. This is diluted with base varnish and mineral oil, and manganese naphthenate as drier is added in a muller to prepare a ready-to-print ink comprising 50% by weight of the paste, 41% by weight of the base varnish, 7.5% by weight of mineral oil of boiling range from 280° to 310° C. and 1% by weight of drier. This is printed onto art paper APCO II/II on the test printing device from Prüfbau and the test prints are evaluated as a function of the amount of ink transferred. The tack and the absorption of the inks are determined. The results of the tests on these printing inks are shown in the table.

Definitions

Tack (measure of ink transfer); measured with the Inkomat from Prüfbau

Absorption (measure of drying); the evaluation is carried out with the aid of the test printing device, with lateral reversal onto unprinted paper immediately after printing. The less color transferred in the lateral reversal, the better the drying. Evaluation is carried out visually, with the mark 1 being very good performance, the mark 6 being very poor performance.

| Ink | A | B |
| --- | --- | --- |
| Viscosity of base varnish [Pa · s/23° C., shear rate 50 s$^{-1}$] | 30 | 8.5 |
| Viscosity of printing ink [Pa · s/23° C., shear rate 50 s$^{-1}$] | 43 | 19 |
| Tack of the printing ink at 200 m/s | 10.3 | 21 |
| Absorption [mark 1 to 6] | 2.0 | 5.5 |

What is claimed is:

1. A phenolic-resin-modified cyclopentadiene resin which is prepared from
   a) from 20 to 80% by weight of cyclopentadiene compounds,
   b) from 1 to 40% by weight of natural resin acids,
   c) from 1 to 60% by weight of phenols and
   d) from 1 to 20% by weight of aldehydes in the presence of
   e) from 0.01 to 1% by weight of basic lithium compounds.
2. A printing ink containing as a binder the phenolic-resin-modified-cyclopentadiene resins of claim 1.

* * * * *